United States Patent [19]

Quint et al.

[11] Patent Number: 5,546,099
[45] Date of Patent: Aug. 13, 1996

[54] HEAD MOUNTED DISPLAY SYSTEM WITH LIGHT BLOCKING STRUCTURE

[75] Inventors: Jessica L. Quint, Seattle; Joel W. Robinson, Bothell, both of Wash.

[73] Assignee: Virtual Vision, Redmond, Wash.

[21] Appl. No.: 339,634

[22] Filed: Nov. 14, 1994

Related U.S. Application Data

[63] Continuation of Ser. No. 101,553, Aug. 2, 1993, abandoned.

[51] Int. Cl.$^6$ ............................................. G09G 5/00
[52] U.S. Cl. ................................. 345/8; 128/857; 2/15
[58] Field of Search .................. 345/7, 8, 9; 359/13, 359/630, 631, 632, 633, 629, 610, 601; 128/857, 858, 859; 2/15, 428, 429, 431, 6.3, 6.7, 9, 10, 426, 424, 427; 433/136, 137; 351/158

[56] References Cited

U.S. PATENT DOCUMENTS

| | | | |
|---|---|---|---|
| 683,012 | 9/1901 | Hill | 359/610 |
| 1,251,657 | 1/1918 | Hart | 2/10 |
| 1,637,092 | 5/1926 | Thompson | 2/431 |
| 1,807,475 | 5/1931 | Gibson | 2/15 |
| 3,712,714 | 1/1973 | Uyeda | 345/8 |
| 3,950,086 | 4/1976 | Schulman | 358/93 |
| 4,250,577 | 2/1981 | Smith | 2/427 |
| 4,260,376 | 4/1981 | Litel | 358/93 |
| 4,344,758 | 8/1982 | Wielhouwer | 433/137 |
| 4,559,555 | 12/1985 | Schoolman | 358/88 |
| 4,653,124 | 3/1987 | McNeal | 2/427 |
| 4,729,648 | 3/1988 | Armstrong | 359/610 |
| 4,843,643 | 7/1989 | Parissenti | 128/857 |
| 4,924,526 | 5/1990 | Parissenti | 2/9 |
| 4,937,880 | 7/1990 | Beard | 128/857 |
| 4,944,039 | 7/1990 | Dietrich | 2/9 |
| 4,969,473 | 11/1990 | Bothwell | 128/858 |
| 5,003,300 | 3/1991 | Wells | 345/8 |
| 5,035,004 | 7/1991 | Koester | 2/10 |
| 5,162,828 | 11/1992 | Furness et al. | |
| 5,189,512 | 2/1993 | Cameron | 359/610 |

OTHER PUBLICATIONS

"Virtual Novocaine." Newsweek. 17 Jan. 1994. p. 5.

*Primary Examiner*—Richard Hjerpe
*Assistant Examiner*—Xiao M. Wu
*Attorney, Agent, or Firm*—McAndrews, Held & Malloy, Ltd.

[57] ABSTRACT

A head mounted display system includes an eye shade with a central opaque portion to block out light in the central field of view of the user's eyes and transparent or semi-transparent side portions on either side of the central portion so as to maintain the user's side peripheral vision substantially free from obstruction. A shield may be mounted on the lower peripheral edge of the eye shade so as to block light, water spray and particles from entering the interior of the head mounted display system.

31 Claims, 3 Drawing Sheets

HEAD MOUNTED DISPLAY SYSTEM WITH LIGHT BLOCKING STRUCTURE

This is a continuation of application Ser. No. 08/101,553, filed Aug. 8, 1993, now abandoned.

TECHNICAL FIELD

The present invention is directed to a head mounted display system and more particularly to a head mounted display system having a structure to block light in the central field of the user's view while maintaining the user's side peripheral vision substantially free from obstruction. The head mounted display system also has structure to block light or particles from entering the system from the bottom thereof.

BACKGROUND OF THE INVENTION

A known head mounted display system as shown in U.S. Pat. No. 5,162,828 includes a display that is mounted on a frame worn on a user's head. This system also includes a reflector into which a user looks to view an image of the information depicted on the display. The position of the reflector is such that it is seen by only one eye of the user, the user's dominant eye. Although the image is seen only by the user's dominant eye, that eye sends information to the user's brain such that the user perceives that he is seeing the image with both eyes.

This monocular system has many advantages over a binocular system. However, users who are right-eye dominant can have difficulty viewing an image through a reflector that is positioned to be viewed by a user's left eye only, hereinafter referred to as a left-eye dominant system. Similarly, users who are left-eye dominant can have difficulty viewing a reflector that is positioned to be viewed by a user's right eye only, hereinafter referred to as a right-eye dominant system. Eye dominance is not a problem when an individual purchases a monocular head mounted display system for his personal use since the user will purchase either a right or left eye dominant system depending upon his own eye dominance. However, when the monocular head mounted display system is to be worn by a large number of different people such as passengers on an airplane or patients in a dental or medical facility, the airplane or facility must stock enough systems to accommodate various numbers of right eye and left eye dominant users. Use of this monocular system by the public thus requires a large inventory of both right and left eye dominant systems.

SUMMARY OF THE INVENTION

In accordance with the present invention, the disadvantages of known head mounted display systems have been overcome. The head mounted display system of the present invention includes structure for blocking light from a central field of view of the user's eyes to reduce the effects of eye dominance such that a right eye dominant person can use a left-eye dominant system and a left-eye dominant person can use a right-eye dominant system.

More particularly, the head mounted display system of the present invention includes a frame to be worn on a user's head and a video display that is supported by the frame. The system also includes optics supported by the frame wherein the optics are positioned relative to the video display to provide an enlarged image of the video information that is perceived by a user to be at a distance from the user. The optics include at least one optical element that is viewable by a user to perceive the displayed image. Means are provided for blocking out light in the central field of view of the user's eyes while maintaining the user's side peripheral vision substantially free from obstruction and wherein the viewing optical element is disposed between the blocking means and the user's face.

In one embodiment of the present invention, the blocking means is in the form of an eye shade having an opaque central portion for blocking light and having clear i.e., transparent, or tinted i.e. semi-transparent, portions on opposite sides of the opaque central portion so as to maintain the user's side peripheral vision substantially unobstructed. The opaque central portion extends from a center line of the eye shade to behind an outer edge of the viewing optical element on one side of the eye shade and it extends an equal distance from the center line on the other side of the eye shade.

The blocking means of the present invention has a number of advantages. For example, when used in a monocular system, the blocking means overcomes the effects of eye dominance such that a right-eye dominant person can utilize a left-eye dominant monocular system and visa versa. Further, when the blocking means is used in either a monocular or binocular system, the blocking means eliminates glare from intense light shining directly into the user's eyes. Such light will generally be present in a dentist's office or other medical facility in which the patient may be wearing the head mounted display system while the dentist/doctor is working on the patient. Further, for head mounted display systems in which the user can see at least a portion of the real world while viewing the displayed image, the blocking means prevents the user from focusing at a distance corresponding to a real-world object that is very close to the user. For example, when a user is wearing such a head mounted display system on an airplane, the blocking means inhibits the user from focusing on the back of the seat in front of him. This feature makes it easier for the user to perceive the displayed image at a distance that is greater than the distance that the real-world object in front of him, i.e. the airplane seat in front of him, is positioned. However, because the blocking means is such as to maintain the user's side peripheral vision generally free from obstruction, the user is cognizant of his surroundings and can see someone next to him or a person approaching him. Further, when the head mounted display system is being worn by a dental patient, because the user's side peripheral vision is not blocked, the dentist can see the user's eyes. This is extremely important because dentists use the patient's eyes to discern whether the patient is feeling pain, fear, etc. since the patient cannot verbally communicate these feelings when the dentist is working in his mouth.

Another feature of the present invention is a shield that is mounted on a lower peripheral edge of the eye shade such that when the system is mounted on the user's head the shield extends towards the user's face and may abut the user's face or is preferably spaced slightly therefrom. The shield extends approximately the length of the eye shade so as to extend substantially across the width of a user's face when worn. Thus, the shield blocks intense light that may enter the bottom of the system when the head mounted display system is worn, for example, by a dental or medical patient. The shield also blocks water, chemicals, and other particles that may be deflected towards the head mounted display system from the bottom thereof while the system is being worn. The shield is preferably made of a flexible material so as to provide a cushion against the user's face in the event that the shield contacts the face.

These and other objects, advantages and novel features of the present invention as well as details of an illustrated embodiment thereof, will be more fully understood from the following description and the drawing.

DESCRIPTION OF THE PREFERRED EMBODIMENT

Figure 1:
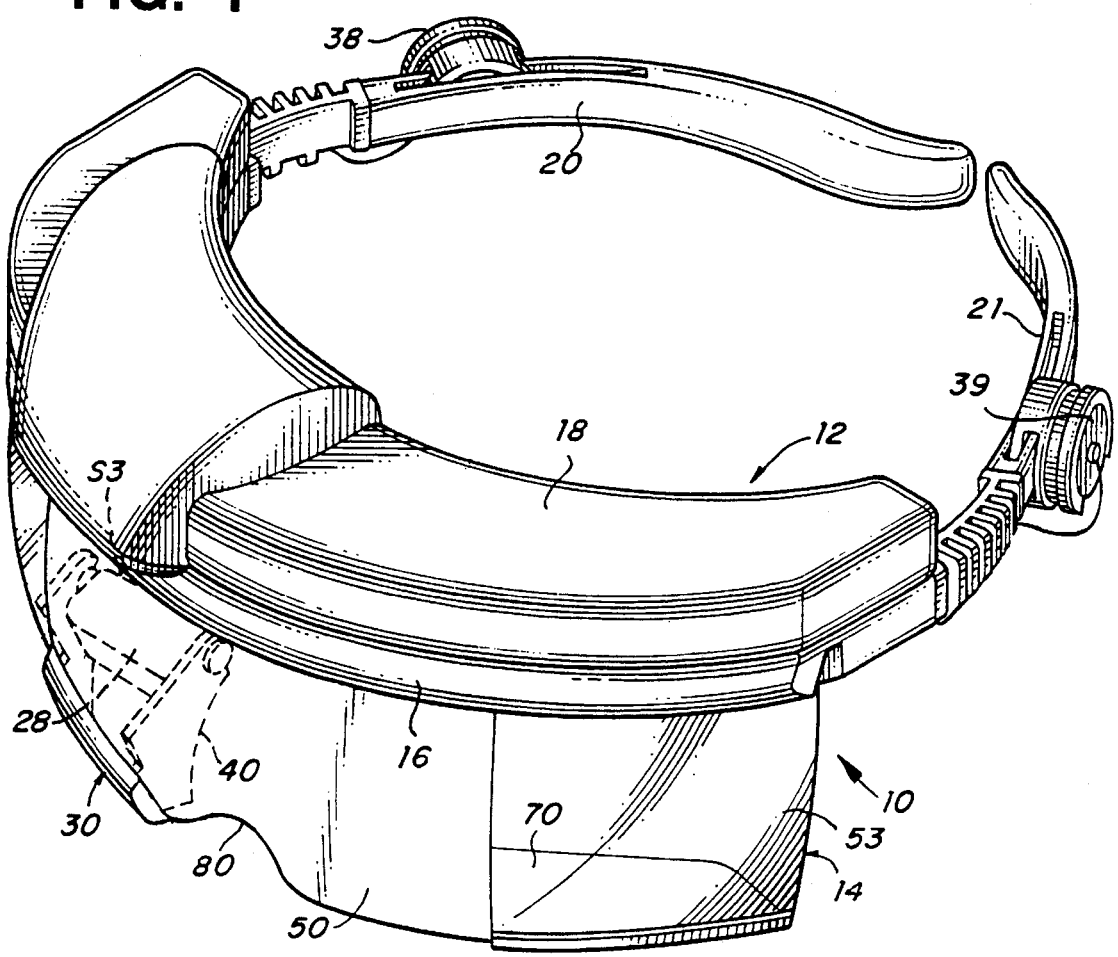
FIG. 1 is a front perspective view of the head mounted display system of the present invention taken from the side.

The head mounted display system 10 of the present invention, as shown in FIG. 1, includes a frame generally designated 12 so as to support the system 10 on a user's head. The frame 12 includes an eye shade 14 that is removably mounted in a shade holder 16. The frame 12 also includes a top cover 18, a nose piece 24, and right and left temples 20 and 21. The temples 20 and 21 support respective earphones 38 and 39 that provide audio for the system. The top cover 18 is mounted over the shade holder 16 so as to form a housing therebetween for a display 26 and circuitry for driving the display and audio system. The circuitry contained in the housing formed by the top cover 18 and shade holder 16 as well as a portable interface unit for the head mounted display system 10 are disclosed in detail in U.S. patent application Ser. No. 07/793,155, filed Nov. 6, 1992, entitled PORTABLE VIDEO DISPLAY SYSTEM, and assigned to the assignee of the present invention, and in U.S. patent application Ser. No. 07/986,422, filed Dec. 4, 1992, entitled HEAD MOUNTED VIDEO DISPLAY SYSTEM WITH PORTABLE VIDEO INTERFACE UNIT, and also assigned to the assignee of the present invention. Each of these applications is incorporated herein by reference.

The display 26 may be formed of a miniature liquid crystal video display with or without a diffuser, diffractive grating, filter or lens. The display 26 may be extremely small such as on the order of 0.6 inches by 0.9 inches. However, the display is capable of generating a high resolution video image such as a television image or a computer generated image. The display 26 is mounted over an aperture 27 in the shade holder 16 so that the information depicted on the display 26 can be reflected by an optical element 28.

In a preferred embodiment, the optical element 28 has three distinct surfaces, an entrance surface S1 that receives video information from the display 26, an exit surface S3 wherein the user views the video image directly through the exit surface and a reflective surface S2 that reflects the video image from the entrance surface to the exit surface. The optical surfaces S1, S2, and S3 of the element 28 are shaped to generate a magnified virtual image of the displayed information at an apparent location a distance from the user that is substantially greater than the actual distance between the display 26, the reflective surface S2 and the user's eye. For example, the optical element 28 may generate a virtual image the size of which along a diagonal is between ten inches at an apparent distance from the user of two feet and eighty inches at an apparent distance of fifteen feet. However, the optical element is also shaped to minimize distortion, astigmatism and chromatic aberations so as to provide a virtual image of high quality and resolution. The optical element 28 is described in detail in U.S. patent application Ser. No. 08/045,919, filed Apr. 12, 1993, entitled HEAD MOUNTED DISPLAY SYSTEM and assigned to the assignee of the present invention. This application is incorporated herein by reference.

The optical element 28 is supported on the frame 12, and in particular, mounted on the eye shade 14 by a support member 30. The optical element 28 is mounted on the support 30 for pivotal movement about an axis of rotation that extends through the element 28 and the arms 34 and 36 of the support 30. The pivotal movement of the optical element 28 in the support 30 allows the optical path defined by the display 26, the optical element 28 and an eye of the user to be adjusted relative to a first axis which is the axis of rotation or axis about which the element 28 pivots. The optical element 28 is also adjustably mounted in the support 30 in a generally vertical direction so that a user can adjust the distance between the entrance surface S1 of the optical element 28 and the display 26 to increase or decrease the apparent distance of the virtual image from the user.

Figure 5:
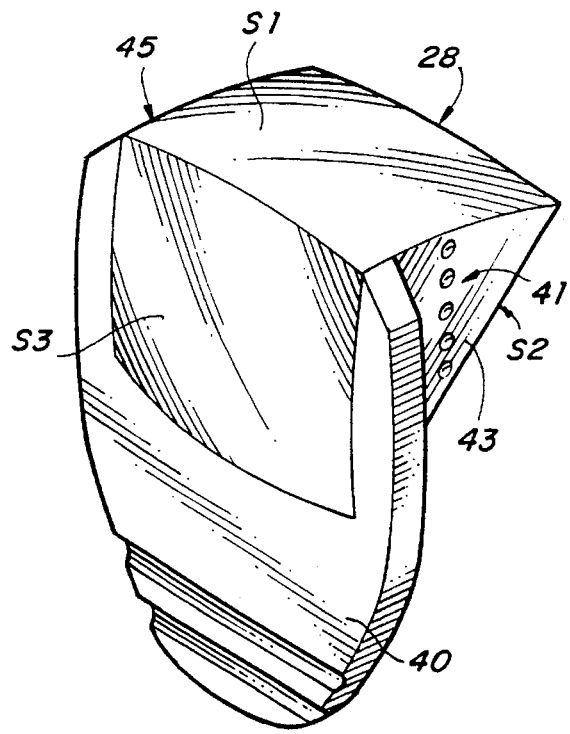
FIG. 5 is a front perspective view of the optical element depicted in FIGS. 1–3 with an adjustment mechanism attached thereto.
Figure 6:
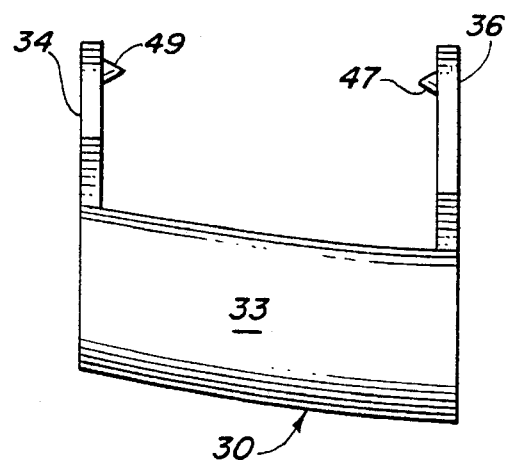
FIG. 6 is a front view of a support for the optical element of FIG. 5.
Figure 7:
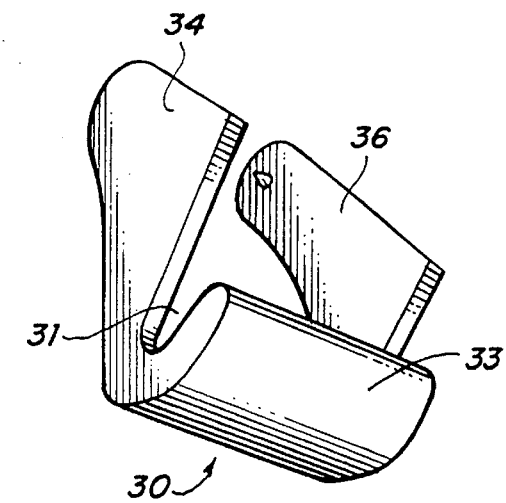
FIG. 7 is a side perspective view of the support for the optical element of FIG. 5.
Figure 8:
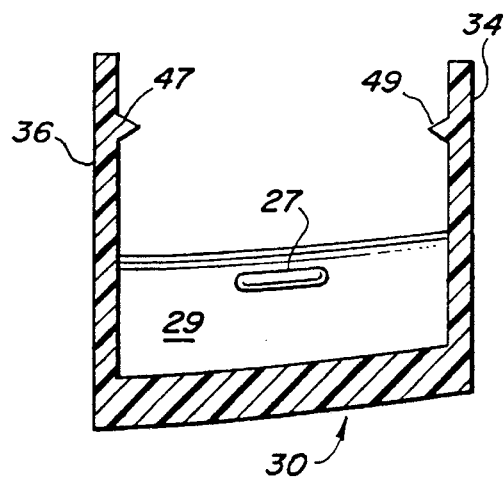
FIG. 8 is a cross-sectional view of the support for the optical element of FIG. 5 taken from the back and through the arms of the support.

More particularly, the optical element 28 as shown in FIG. 5 includes a number of vertically aligned apertures 41 disposed on each of a pair of sidewalls 43 and 45 of the optical element. The apertures 41 on each sidewall 43, 45 are horizontally aligned in pairs so as to be engagable by a respective pair of protrusions 47, 49 that extend inwardly from the arms 36, 34 of the support 30 shown in detail in FIGS. 6–8. The protrusions 47, 49 engage an aperture pair so as to allow the optical element to pivot about an axis extending through the protrusions 47, 49. By moving the optical element 28 up and down with respect to the support 30 so that the protrusions engage different horizontally aligned aperture pairs, the distance between the entrance surface S1 of the optical element 28 and the display 26 can be adjusted. The arms 34 and 36 are spaced from a wall 33 of the support 30 to provide an opening 31 therebetween. On an inner surface 29 of the wall 33 of the support 30, a protrusion 27 extends so that when a lower peripheral edge 72 of the eye shade 14 is inserted into the opening 31 of the support 30, the protrusion 27 will extend through an aperture 25 in the eye shade 14. The support 30 is thus securely mounted on the eyeshade 14 so that the optical element 28 is disposed between the eyeshade 14 and the user's face.

A plastic finger tab 40 is mounted on the optical element 28 such that the tab 40 extends downwardly from the element 28 and is accessible by a user when the display system 10 is mounted on the user's head. The user can adjust the distance between the entrance surface S1 and the display 26 by pulling down on the finger tab 40 or by pushing up thereon so as to move the optical element 28 with respect to the support 30. The user can also pivot the element 28 about its axis of rotation by engaging the finger tab 40.

In accordance with one embodiment of the present invention, the eye shade 14 includes an opaque central portion 50 and respective transparent or semi-transparent side portions 52 and 53. More particularly, the eye shade may be formed of a clear or tinted plastic such as polycarbonate. The opaque central portion 50 may be formed by painting or screening black paint or other opaque material on an inner surface of the shade 14 in the central area shown at 50 wherein the inner surface is that surface of the shade 14 adjacent the user's face when the system 10 is worn.

Figure 2:
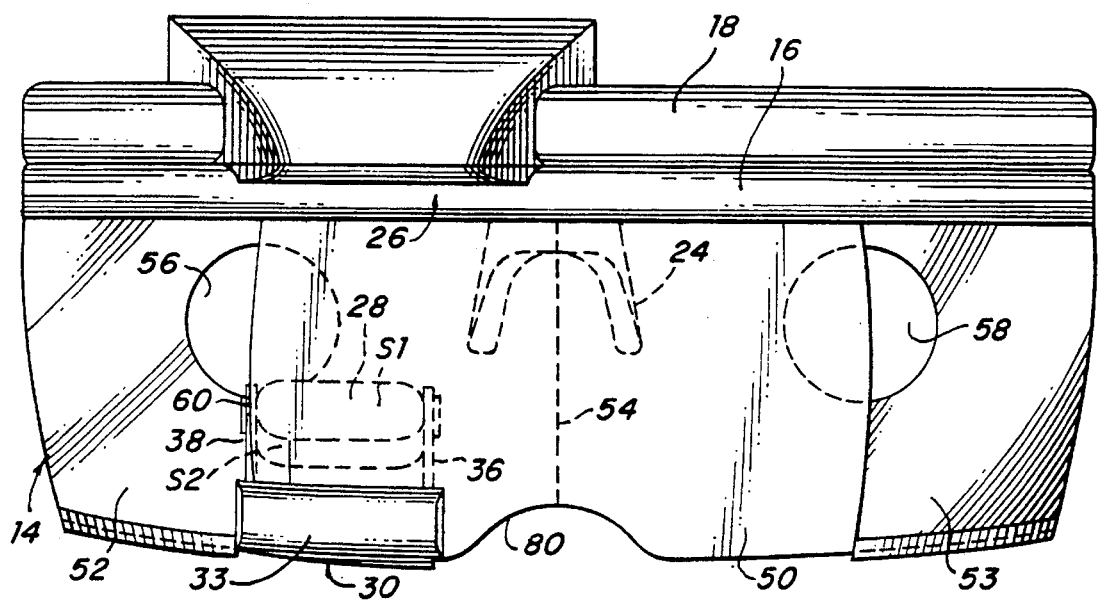
FIG. 2 is a front view of the head mounted display system depicted in FIG. 1.
Figure 3:
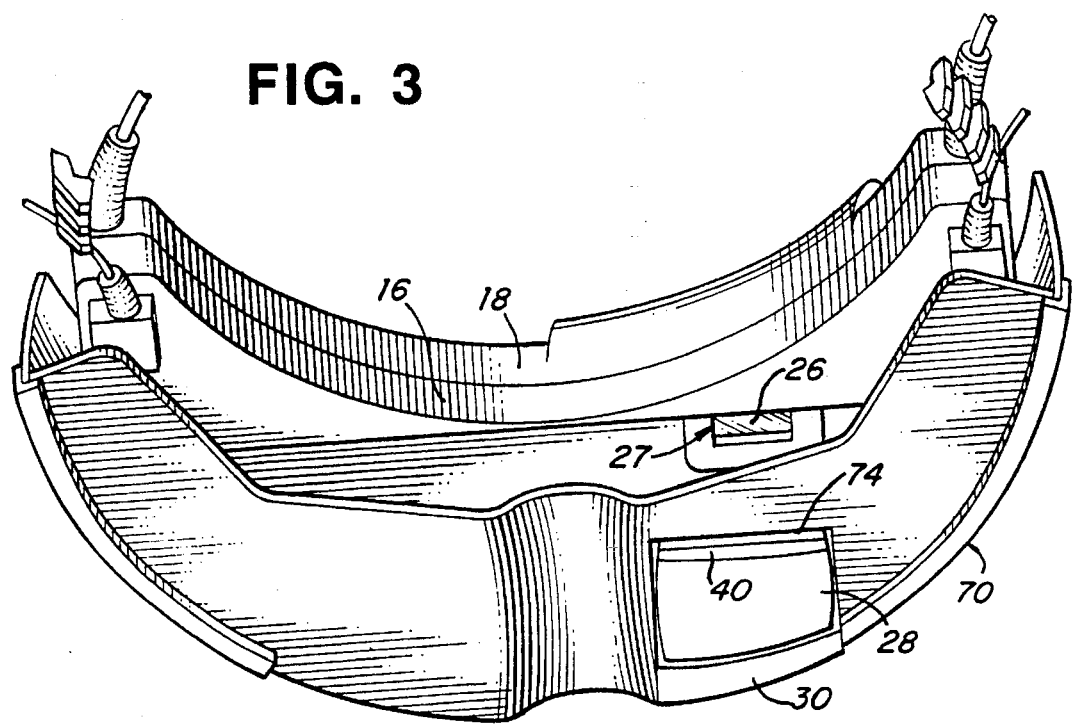
FIG. 3 is a partial back perspective view of the head mounted display system of FIG. 1 taken from the bottom.
Figure 4:
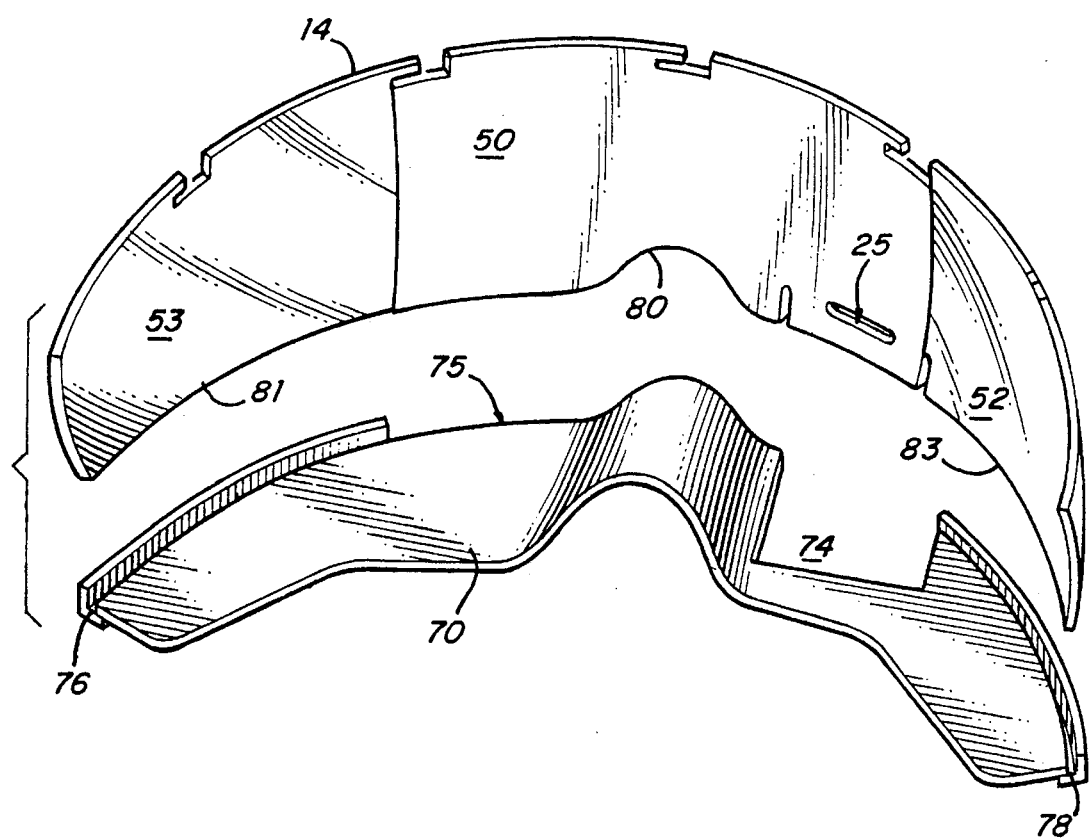
FIG. 4 is an exploded view of the eye shade and shield of the head mounted display system depicted in FIG. 1.

The opaque central portion 50 extends an equal distance to the right and left from a vertical center line 54 of the eye shade that coincides generally with the center of the nose piece 24. The opaque central portion 50 preferably extends a sufficient distance from the vertical center line 54 so as to block light directly in front of the user from entering the central field of view of the user's eyes. However, the opaque central portion preferably does not completely cover the user's eyes as shown diagrammatically at 56 and 58 in FIG. 2. More particularly, the opaque central portion 50 blocks light from the outside of the system 10 in the central field of view of the user's eyes 56, 58; but the opaque central portion 50 does not obscure the user's side peripheral vision. The central field of view of a user's eyes is such that the user can focus on objects within his central field of view when he looks straight ahead. While looking straight ahead and focusing on an object in his central field of view the user is aware of or sees, but not as clearly, objects that are within his side peripheral vision. Thus, when the user looks straight ahead while wearing the system 10, his central field of view is blocked by the opaque portion 50; however, while focusing straight ahead, the user's side peripheral vision is not blocked. The user can thus clearly see his surroundings by shifting his focus to the right or left. The opaque central portion 50 may be approximately four inches in width such that it extends two inches to the right and left of the center line 54. The central opaque portion 50 also extends the entire height of the eye shade, the height being illustrated by the length of the center line 54. Further, the opaque central portion preferably extends from the center line 54 to at least a point that coincides with the outer edge 60 of the optical element 28 to and an equal distance on the opposite side of the center line. Thus, the opaque central portion 50 forms a dark background on which the image from the display is projected.

The eye shade 14 with opaque central portion 50 and clear or tinted side portions 52, 53 has several advantages. For example, when used with the monocular optical system depicted in FIGS. 1 and 2, the opaque central portion 50 substantially eliminates the effects of eye dominance such that a right-eye dominant user can comfortably view an image displayed by a left-eye dominant optical system. Similarly, a left-eye dominant user can comfortably view an image displayed by a right-eye dominant optical system. Thus, a monocular head mounted display system utilizing the eye shade 14 in accordance with the present invention may be comfortably worn by both right eye and left eye-dominant people without regard to eye dominance. Therefore, such a monocular head mounted display system is suitable for use by the public such as on airplanes or by patients in a dental or medical facility. A large inventory of both right-eyed dominant and left-eyed dominant monocular head mounted display systems need not be maintained on the airplane or in such a facility.

Further, when the system 10 utilizing the eye shade 14 of the present invention is worn in a situation in which it is difficult to focus at a distance, such as on an airplane where the seat in front of the user is close to the user and blocks the user's view straight ahead, the opaque central portion 50 allows the user's eyes to relax and to focus at a distance that is preferably controlled by the optical element 28. Also, when used by patients of a dentist or medical doctor, while the dentist/doctor is working on the patient, the opaque central portion eliminates the glare from the intense lighting required by the dentist or doctor. Because the user's eyes are not obscured, a dentist, in particular can see his patient's eyes while the patient is wearing the system 10 so that the dentist can discern pain, fear, etc. in the patient by viewing his eyes. Further, because the central portion 50 does not obscure the user's side peripheral vision, when the user is wearing the system 10 in public, such as on an airplane, the user can see what is happening in his surroundings.

Another feature of the present invention is a shield 70 that is removably or detachably mounted on a lower peripheral edge 72 of the eye shade 14. The shield 70 preferably extends substantially the width of the eye shade 14 and when mounted on the shade 14 the shield extends in towards the user's face so that it abuts the user's face or is minimally spaced therefrom. The shield thus prevents light or glare from entering the interior of the system 10 from the bottom thereof. Further, when used by dental patients the shield blocks water spray, and particles from entering the interior of the system.

When employed with an adjustably mounted optical element 28 having an adjustment tab 40 or the like that is accessed by a user from the bottom of the system 10, the shield is preferably formed with an aperture that underlies the optical element 28 so that the adjustment mechanism 40 can be accessed through the aperture 74 of the shield. The aperture 74 is large enough to permit adjustment of the optical element 28 but small enough so that the back of the optical element 28 and/or adjustment mechanism 40 substantially blocks light and water spray, etc. from entering the interior of the system 10.

The shield 70 is preferably made of a material that is flexible, non-porous and non-absorbent to water, and solvents as well as heat resistant and chemical resistant. For example, the shield 70 may be made approximately 0.06 inches thick of medical grade urethane. The shield 70 may also include a foam edge or the like adjacent the user's face to further cushion the user's face if the shield abuts it. The shield is formed with either a single continuous channel or a number of channels adjacent its outer peripheral edge 75 to allow the lower peripheral edge 72 of the eye shade to be inserted into the channel(s) to detachably mount the shield 70 onto the eye shade 14. For dental applications, the eye shade 14 may be formed with a centrally located rounded notch 80 in the lower peripheral edge 72 thereof so as to accommodate a nitrous mask. If the eye shade 14 is formed with such a notch 80, two channels 76 and 78 extending from respective outer edges, partially inwardly towards the center of the shield may be utilized for example to engage respective portions 81, 83 of the lower peripheral edge 72 of the eye shade 14. Because the shield 70 is detachably mounted on the eye shade 14, it may be removed when not needed. If desired, however, the shield 70 may also be fixedly mounted on the eye shade 14.

It is noted that although the present invention is described for use with one type of monocular optical system, it may also be used with other monocular systems as well. For example, an optical viewing element having a single reflective surface may be used instead of an optical element having three distinct surfaces. The optics employed may also include additional lenses, reflectors and the like. Further, the present invention may also be used with various binocular optical systems since it has advantages other than the elimination of eye dominance. It is also noted that the blocking means may take a form other than an eyeshade in accordance with the present invention. Many other modifications and variations of the present invention are possible in view of the above teachings, as will be apparent to one of ordinary skill in the art. Therefore, it is to be understood that, within the scope of the appended claims, the invention may be practiced otherwise than as described hereinabove.

What is claimed and desired to be secured by Letters Patent is:

1. A head mounted display system comprising:
   a frame to be worn on a user's head;
   a video display for depicting video information mounted on said frame; and
   an eyeshade mounted on said frame, said eyeshade having an opaque central portion for blocking light from a central field of view of both of the user's eyes, said eyeshade maintaining the side peripheral vision of each of the user's eyes substantially unobstructed so that the user's eyes may be viewed by an outside observer; and
   optics supported by said frame, said optics positioned relative to said display to provide an enlarged image of said video information that is perceived by a user to be at a distance from the user and said optics including at least one optical element viewable by a user to perceive said image, said viewing optical element being mounted on said eyeshade so as to be positioned between said eyeshade and the user's face.

2. A head mounted display system as recited in claim 1 wherein said opaque central portion is generally symmetrical about a vertical center line of the eyeshade so as to extend from the center line the same distance into the user's right eye field of view as said central blocking portion extends into the user's left eye field of view, said blocking portion extending from the centerline to at least an outer edge of said viewing optical element.

3. A head mounted display system as recited in claim 1 wherein said opaque central portion is centered on said eyeshade and is approximately four inches in width.

4. A head mounted display system as recited in claim 1 wherein said eyeshade includes first and second side portions disposed on opposite sides of said opaque central portion wherein said side portions are at least semi-transparent.

5. A head mounted display system as recited in claim 4 wherein said first and second side portions are clear.

6. A head mounted display system as recited in claim 4 wherein said first and second side portions are tinted.

7. A head mounted display system as recited in claim 1 wherein said optics is formed of a single optical element.

8. A head mounted display system as recited in claim 1 wherein said blocking means includes an eyeshade and said system further includes a shield mounted on a lower peripheral edge of said eyeshade such that when said system is mounted on the user's head said shield extends towards the user's face.

9. A head mounted display system as recited in claim 8 wherein said shield is formed of a flexible material.

10. A head mounted display system as recited in claim 8 wherein said shield is formed of a material that blocks out light from entering the system from the bottom thereof.

11. A head mounted display system as recited in claim 8 wherein said shield is formed of a material that is nonabsorbent.

12. A head mounted display system as recited in claim 8 wherein said shield is detachable from said eyeshade.

13. A head mounted display system as recited in claim 1 wherein said source of video information is a liquid crystal display.

14. A head mounted display system as recited in claim 1 wherein said image is viewable by only a single eye of the user.

15. A head mounted display system comprising:
   a frame to be worn on a user's head;
   a source of video information supported by said frame;
   optics supported by said frame, said optics positioned relative to said source of video information to provide an enlarged image of said video information that is perceived by a user to be at a distance from the user and said optics including at least one viewing optical element viewable by a user to perceive said image;
   means for blocking out light in the central field of view of both of the user's eyes while maintaining the side peripheral vision of each of the user's eyes substantially free from obstruction so that the user's eyes may be viewed by an outside observer, said viewing optical element being disposed between said blocking means and said user's face.

16. A head mounted display system as recited in claim 15 wherein said blocking means includes an eyeshade having a central portion that blocks light and first and second side portions that are at least semi-transparent to light.

17. A head mounted display system as recited in claim 16 wherein said first and second side portions are clear.

18. A head mounted display system as recited in claim 16 wherein said first and second side portions are tinted.

19. A head mounted display system as recited in claim 15 wherein said optics is formed of a single optical element.

20. A head mounted display system as recited in claim 15 wherein said blocking means includes an eyeshade and said system further includes a shield mounted on a lower peripheral edge of said eyeshade such that when said system is mounted on the user's head said shield extends towards the user's face.

21. A head mounted display system as recited in claim 20 wherein said shield is formed of a flexible material.

22. A head mounted display system as recited in claim 20 wherein said shield is formed of a material that blocks out light from entering the system from the bottom thereof.

23. A head mounted display system as recited in claim 20 wherein said shield is formed of a material that is nonabsorbent.

24. A head mounted display system as recited in claim 20 wherein said shield is detachable from said eyeshade.

25. A head mounted display system as recited in claim 15 wherein said source of video information is a liquid crystal display.

26. A head mounted display system as recited in claim 15 wherein said image is viewable by only a single eye of the user.

27. A head mounted display system comprising:
   a frame to be worn on a user's head;
   a source of video information supported by said frame;
   an eyeshade supported by said frame, said eyeshade having a lower peripheral edge;
   optics supported by said frame, said optics positioned relative to said source of video information to provide an enlarged image of said video information that is perceived by a user to be at a distance from the user and said optics including at least one optical element viewable by a user to perceive said image, said viewing optical element being mounted on said eyeshade so as to be positioned between said eyeshade and the user's face; and
   a shield detachably mounted on said lower peripheral edge of said eyeshade, extending substantially the length of said eyeshade and in towards the user's face between said eyeshade and said user's face such that said shield is generally perpendicular to said eyeshade, said shield being formed of a flexible material.

28. A head mounted display system as recited in claim 27 wherein said shield includes at least one channel extending adjacent at least one portion of an outer peripheral edge of said shield, said channel accepting at least a portion of said lower peripheral edge of said eyeshade to detachably mount said shield to said eyeshade.

29. A head mounted display system as recited in claim 27 wherein said shield includes first and second spaced channels, generally longitudinally aligned and extending adjacent respective portions of the outer peripheral edge of said shield, said first and second channels accepting respective portions of said lower peripheral eyeshade edge to mount the shield on the eyeshade.

30. A head mounted display system as recited in claim 27 wherein said viewing optical element is movably mounted on said eyeshade so that the position of the optical element can be adjusted and said shield includes an aperture to allow access to said optical element for adjustment thereof.

31. A head mounted display system comprising:

a frame to be worn on a user's head;

a source of video information supported by said frame;

an eyeshade supported by said frame, said eyeshade having a lower peripheral edge;

optics supported by said source of video information to provide an enlarged image of said video information that is perceived by a user to be at a distance from the user and said optics including at least one optical element viewable by a user to perceive said image, said viewing optical element being mounted on said eyeshade so as to be positioned between said eyeshade and the user's face;

an adjustment mechanism coupled to said optical element to allow the position of said optical element relative to said source of video information and/or a user's eye to be manually adjusted; and a shield mounted on said lower peripheral edge of said eyeshade and extending substantially the length of said eyeshade and in towards the user's face between said eyeshade and the user's face, said shield including an aperture therein to allow access to said optical element adjustment mechanism.

\* \* \* \* \*